US009755203B2

(12) United States Patent
Kim et al.

(10) Patent No.: US 9,755,203 B2
(45) Date of Patent: Sep. 5, 2017

(54) RECHARGEABLE BATTERY (71) Applicant: SAMSUNG SDI CO., LTD., Yongin-si, Gyeonggi-do (KR)

(72) Inventors: Dae-Kyu Kim, Yongin-si (KR); Takao Abe, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 324 days.

(21) Appl. No.: 14/680,636

(22) Filed: Apr. 7, 2015

(65) Prior Publication Data
US 2015/0287965 A1 Oct. 8, 2015

(30) Foreign Application Priority Data
Apr. 8, 2014 (KR) .................. 10-2014-0041969

(51) Int. Cl.
*H01M 2/12* (2006.01)
*H01M 2/34* (2006.01)
(Continued)

(52) U.S. Cl.
CPC ....... *H01M 2/1241* (2013.01); *H01M 2/0404* (2013.01); *H01M 2/046* (2013.01);
(Continued)

(58) Field of Classification Search
CPC ... H01M 2/0413; H01M 2/046; H01M 2/1241
(Continued)

(56) References Cited

U.S. PATENT DOCUMENTS

| 6,207,320 B1 | 3/2001 | Song et al. |
| 2009/0186269 A1 | 7/2009 | Kim et al. |

(Continued)

FOREIGN PATENT DOCUMENTS

| EP | 2 104 160 A1 | 9/2009 |
| EP | 2 696 429 A1 | 2/2014 |

(Continued)

OTHER PUBLICATIONS

Extended European Search Report for 15162757.7 dated Jul. 8, 2015; Kim, et al.

*Primary Examiner* — Basia Ridley
*Assistant Examiner* — James Erwin
(74) *Attorney, Agent, or Firm* — Lee & Morse, P.C.

(57) ABSTRACT

A rechargeable battery including an electrode assembly; a case accommodating the electrode assembly; and a cap assembly coupled with an opening of the case with a gasket between the cap assembly and the case, wherein the cap assembly includes a vent plate that is electrically connected to a cap plate; a middle plate that is separated from the vent plate, that includes a through-hole that is penetrated by a vent protruding from the vent plate, and that is electrically connected to the second electrode; an insulator interposed between the vent plate and the middle plate; and a sub-plate electrically connecting the vent with the middle plate, wherein at least one of the vent plate or the middle plate includes a protrusion and a groove facing the insulator, the protrusion being coupled with a complementary groove in the insulator and the groove being coupled with a complementary protrusion in the insulator.

17 Claims, 8 Drawing Sheets (51) Int. Cl.
 *H01M 2/04* (2006.01)
 *H01M 2/08* (2006.01)
(52) U.S. Cl.
 CPC ........... *H01M 2/0413* (2013.01); *H01M 2/08* (2013.01); *H01M 2/1235* (2013.01); *H01M 2/345* (2013.01); *H01M 2/348* (2013.01); *H01M 2200/106* (2013.01); *H01M 2200/20* (2013.01); *H01M 2220/30* (2013.01)
(58) Field of Classification Search
 USPC ........................................................ 429/82
 See application file for complete search history.

(56) References Cited

U.S. PATENT DOCUMENTS

| | | | |
|---|---|---|---|
| 2013/0004834 A1 | 1/2013 | Jiang et al. | |
| 2014/0038005 A1* | 2/2014 | Yamato | H01M 2/1235 429/57 |
| 2014/0045009 A1 | 2/2014 | Kim | |

FOREIGN PATENT DOCUMENTS

| | | |
|---|---|---|
| JP | 2000-48779 A | 2/2000 |
| KR | 10-2011-0035625 A | 4/2011 |

* cited by examiner

RECHARGEABLE BATTERY

CROSS-REFERENCE TO RELATED APPLICATION

Korean Patent Application No. 10-2014-0041969 filed on Apr. 8, 2014, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

With advancement of technology and increasing demand for mobile devices, demand for rechargeable batteries as energy sources has been increasing.

For example, a cylindrical rechargeable battery may include an electrode assembly (formed by disposing electrodes at opposite surfaces of a separator, and winding the electrodes in a jelly roll form), a case (accommodating the electrode assembly), and a cap assembly (sealing an open side or opening of the case).

A gasket may be interposed between the cap assembly and the opening or side of the case to be assembled by a crimping process.

For example, the case may hold an external circumference of the cap assembly with a clamping portion connected to a beading portion (depressed toward a diametrical center of the case) from the opening side.

The cap assembly may be electrically connected to the electrode assembly through a current interrupting device and a positive electrode lead tab.

For example, in the cap assembly, the current interrupting device may include a vent plate electrically connected to the cap plate forming a positive electrode terminal, a middle plate electrically connected to the vent plate, a vent protruding from the vent plate through a through-hole of the middle plate, and a sub-plate connected to the middle plate.

A positive electrode lead tab may be connected to the sub-plate.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly for performing charging and discharging operations; a case accommodating the electrode assembly, the case being electrically connected to a first electrode of the electrode assembly; and a cap assembly coupled with an opening of the case with a gasket between the cap assembly and the case, the cap assembly being electrically connected to a second electrode of the electrode assembly, wherein the cap assembly includes a vent plate that is electrically connected to a cap plate; a middle plate that is separated from the vent plate, that includes a through hole that is penetrated by a vent protruding from the vent plate, and that is electrically connected to the second electrode; an insulator interposed between the vent plate and the middle plate; and a sub-plate electrically connecting the vent with the middle plate, wherein at least one of the vent plate or the middle plate includes a protrusion and a groove facing the insulator, the protrusion being coupled with a complementary groove in the insulator and the groove being coupled with a complementary protrusion in the insulator.

The protrusion and the groove of the insulator may be fusion-bonded to the groove and the protrusion of the at least one of the vent plate or the middle plate.

The protrusion and groove facing the insulator may include a pair of protrusions in the vent plate and includes grooves in the vent plate adjacent to the protrusions.

The protrusion and groove facing the insulator may include a pair of protrusions in the middle plate and includes grooves in the middle plate adjacent to the protrusions.

The protrusion and the groove facing the insulator may include a first protrusion and a first groove on the vent plate, and a second protrusion and a second groove on the middle plate, wherein the first protrusion and the first groove are symmetrical to the second protrusion and the second groove in a stacking direction with the insulator therebetween.

The vent plate and the middle plate may each include air discharging grooves on surface thereof that face the insulator.

The air discharging grooves may extend lengthwise in a radial direction of the insulator and are separated from each other in a circumferential direction.

An angle between a bottom surface of the first groove of the vent plate and an adjacent side surface of the first protrusion of the vent plate may be acute, and an angle between a bottom surface of the second groove of the middle plate and an adjacent side surface of the second protrusion of the middle plate may be acute.

The vent plate may include a pair of facing first protrusions, a width of a bottom surface of the first groove of the vent plate may be greater than a groove opening width between end portions of the pair of facing first protrusions that extend from the bottom surface of the first groove, the middle plate may include a pair of facing second protrusions, and a width of a bottom surface of the second groove of the middle plate may be greater than a groove opening width between end portions of the pair of facing second protrusions that extend from the bottom surface of the second groove.

The insulator may include a pair of first corresponding grooves, the pair of first corresponding grooves having a shape complementary to and being coupled with the pair of first protrusions of the vent plate, a pair of second corresponding grooves, the pair of second corresponding grooves having a shape complementary to and being coupled with the pair of second protrusions of the middle plate, a first corresponding protrusion, the first corresponding protrusion having a shape complementary to and being coupled with the first groove of the vent plate, and a second corresponding protrusion, the second corresponding protrusion having a shape complementary to and being coupled with the second groove of the middle plate.

The pair of first protrusions of the vent plate may be symmetrically disposed about a center line passing through the first groove in a circumferential direction of the cap assembly, the pair of second protrusions of the middle plate may be symmetrically disposed about a center line passing through the second groove in a circumferential direction of the cap assembly, an angle between the bottom surface of the first groove of the vent plate and an adjacent side surface of each first protrusion of the vent plate may be acute, an angle between the bottom surface of the second groove of the middle plate and an adjacent side surface of each second protrusion of the middle plate may be acute, the vent plate may include an eleventh groove at outer sides of the first groove, the middle plate may include a twenty-first groove at outer sides of the second groove, an angle between a bottom surface of the eleventh groove of the vent plate and another side surface of each first protrusion of the vent plate may be obtuse, and an angle between a bottom surface of the twenty-first groove of the middle plate and another side surface of each second protrusion of the middle plate may be obtuse.

The insulator may be coupled with the vent plate or the middle plate by at least one of a first fusion-bonding to the first groove and the first protrusions of the vent plate at one side thereof, or a second fusion-bonding to the second groove and the second protrusions of the middle plate at another side thereof.

The cap assembly may further include a positive temperature coefficient element between the cap plate and the vent plate.

The insulator may include a first polyethylene layer adjacent to the vent plate, a second polyethylene layer adjacent to the middle plate, and a poly(butylene terephthalate) fiber layer integrally formed between the first and second polyethylene layers.

The middle plate may be connected to the second electrode through a lead tab.

The rechargeable battery may further include an insulating member between a portion of the vent plate and a portion of the cap plate, wherein an end region of the vent plate is bent around the insulator to be electrically connected to a top surface of the cap plate.

The gasket may continuously enclose the vent plate from below, above, and a lateral side thereof at an outer side of the insulator.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
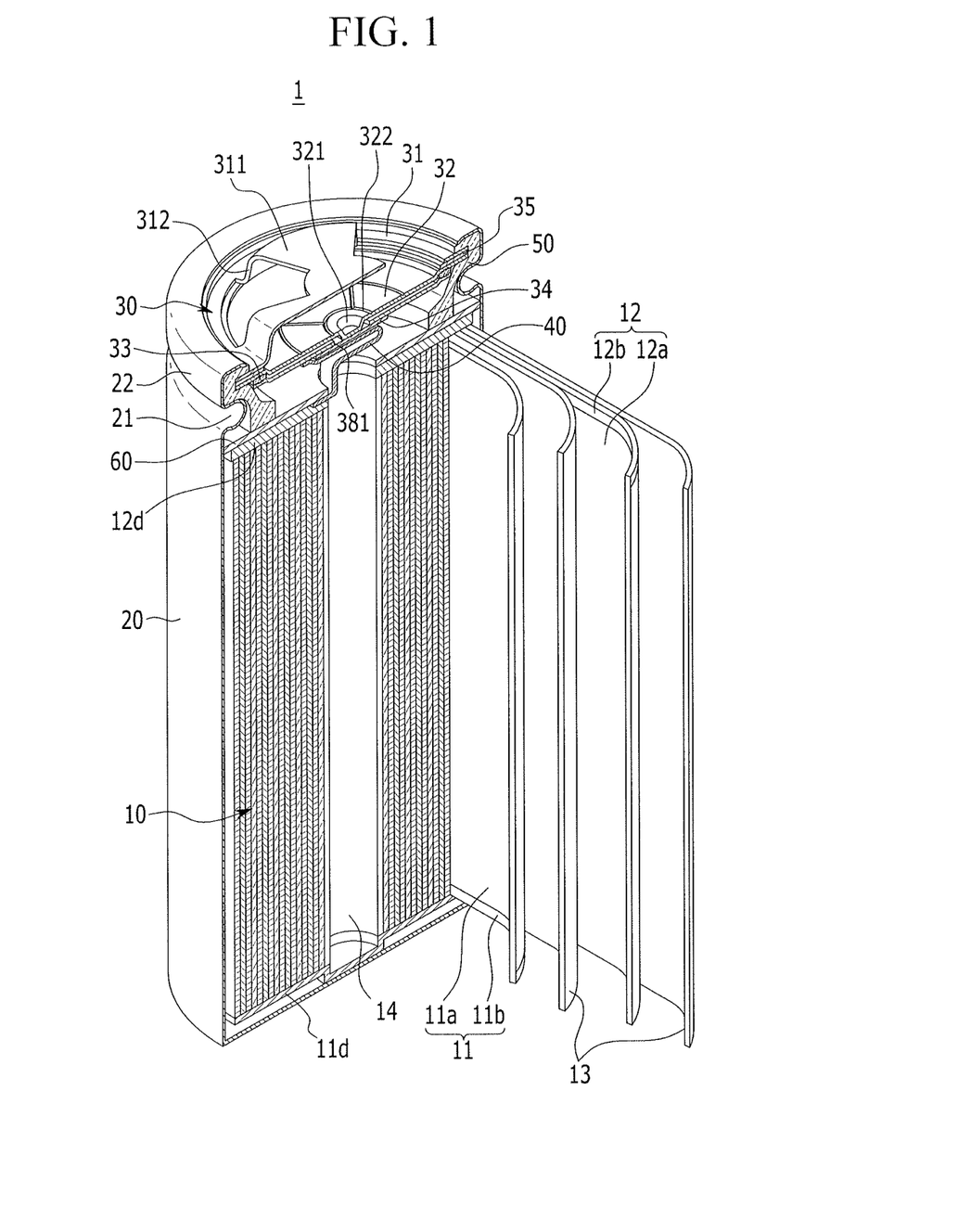
FIG. 1 illustrates a cross-sectional perspective view of a rechargeable battery according to a first exemplary embodiment.

FIG. 1 illustrates a cross-sectional perspective view of a rechargeable battery according to a first exemplary embodiment.

Referring to FIG. 1, the rechargeable battery 1 according to the first exemplary embodiment may include, e.g., an electrode assembly 10 for performing charging and discharging operations; a case 20 accommodating the electrode assembly 10 and being electrically connected to a first electrode 11 of the electrode assembly 10 (e.g., negative electrode); and a cap assembly 30 combined to or coupled with an opening of the case 20. A gasket 50 may be interposed between the cap assembly 30 and the case 20. The cap assembly may be electrically connected to a second electrode 12 of the electrode assembly 10 (e.g., positive electrode).

For example, the electrode assembly 10 may include the negative electrode 11, a separator 13, and the positive electrode 12, which may be sequentially layered.

The electrode assembly 10 may be formed by spirally winding the negative electrode 11, the positive electrode 12, and the separator 13, which is an insulator interposed therebetween, in a jelly roll state.

The electrode assembly 10 may be formed to have a cylindrical shape.

The cylindrical electrode assembly 10 may be provided with a center pin 14 at a center thereof.

The center pin 14 may be formed of a material having higher strength than the electrode assembly 10 to maintain the cylindrical shape of the electrode assembly 10.

The negative and positive electrodes 11 and 12 may include coated regions 11a and 12a (where an active material is coated on opposite surfaces of a current collector formed of a thin metal foil (e.g., aluminum or copper foil)), and uncoated regions 11b and 12b (where an active material is not coated thereon and thus are formed as exposed portions of current collectors).

In the jelly roll state, a negative electrode current collecting plate 11d may be electrically connected to the uncoated regions 11b of the negative electrode 11 of the electrode assembly 10, and a positive electrode current collecting plate 12d may be electrically connected to the uncoated regions 12b of the positive electrode 12 of the electrode assembly 10.

The case 20 may include an opening through which the electrode assembly 10 is inserted, and may be formed in a cylindrical shape to accommodate the cylindrical electrode assembly 10.

The case 20 may be connected, e.g., electrically connected, to the negative electrode current collecting plate 11d by welding to function as a negative electrode terminal in the rechargeable battery 1, and may be formed of a conductive metal, e.g., aluminum, an aluminum alloy, or a nickel-plated metal.

The cap assembly 30 may be combined to or coupled with the case 20 at the opening of the case 20. The gasket 50 may be interposed between the cap assembly 30 and the case 20 to electrically insulate the cap assembly 30 from the case 20.

The cap assembly 30 and the gasket 50 may seal the case 20 in which the electrode assembly 10 and an electrolyte solution may be placed.

The cap assembly 30 may be electrically connected to the electrode assembly 10 through the current interrupting device and the positive electrode lead tab 40.

For example, a positive electrode insulating plate 60 may be interposed between the positive electrode current collecting plate 12d and the cap assembly 30 to insulate therebetween. The positive electrode lead tab 40 (connected to the positive electrode current collecting plate 12d) may penetrate the positive electrode insulating plate 60 toward the cap assembly 30.

Figure 2:
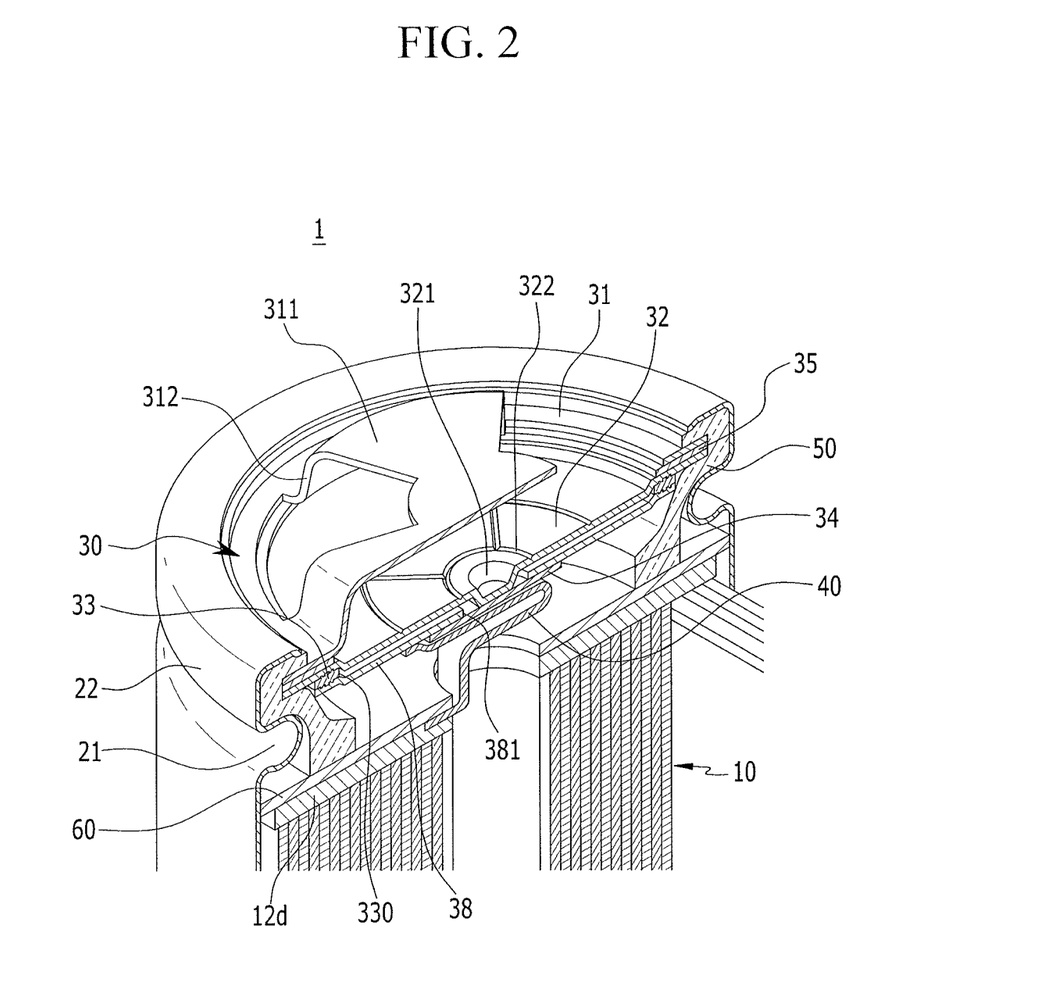
FIG. 2 illustrates a cross-sectional perspective view of a cap assembly of the rechargeable battery of FIG. 1.

FIG. 2 illustrates a cross-sectional perspective view of the cap assembly of the rechargeable battery of FIG. 1.

Referring to FIGS. 1 and 2, the cap assembly 30 may include a cap plate 31, a positive temperature coefficient (PTC) element 35, a vent plate 32, an insulator 33, a middle plate 38, and a sub-plate 34, which may be sequentially disposed toward an inner side of the case 20 from the outside.

The cap plate 31 may be finally or electrically connected to the positive electrode lead tab 40 to function as a positive electrode terminal in the rechargeable battery 1. The cap plate 31 may include a protruding portion 311 (protruding out of the case 20) and an exhaust hole 312 (that is opened toward a side of the protruding portion 311 to discharge internal gas).

In an implementation, in the cap assembly 30, the current interrupting device may include the vent plate 32 and the sub-plate 34 that are electrically separated from each other by the insulator 33, and a connecting portion partially connecting the vent plate 32 and the sub-plate 34.

The connecting portion may be formed by welding the vent plate 32 and the sub-plate 34.

The vent plate 32 (forming one side of the current interrupting device) may be installed at an inner side of the cap plate 31 to be electrically connected to the sub-plate 34 (forming the other side of the current interrupting device).

In an implementation, the vent plate 32 may include a vent 321 at a center thereof that may be welded to the sub-plate 34 (e.g., during normal operation of the battery), and that may be separated from the sub-plate 34 by internal pressure (e.g., during abnormal operation of the battery).

The vent 321 may be ruptured at a predetermined pressure condition, may discharge internal gas, and may cut off the electrical connection with the sub-plate 34.

For example, the vent 321 may protrude toward an interior of the case 20 from the vent plate 32.

The vent plate 32 may include a notch 322 that helps guide the rupture of the vent 321.

For example, when the internal pressure of the case 20 increases due to gas generation, the notch 322 may be pre-ruptured and may discharge the gas to the outside through the vent plate 32 and the exhaust hole 312, thereby helping to prevent an explosion of the rechargeable battery 1.

For example, due to the rupture of the vent 321, the vent plate 32 may be disconnected from the sub-plate 34.

Thus, the electrode assembly 10 and the cap plate 31 may be electrically separated or isolated from each other by an operation of the current interrupting device.

The PTC element 35 may be provided between the cap plate 31 and the vent plate 32 to control a current therebetween according to an internal temperature of the rechargeable battery 1.

When the internal temperature exceeds a predetermined level, the PTC element 35 may have an electrical resistance that increases, e.g., infinitely or sufficiently high to cut off current.

Thus, the PTC element 35 may help control a charging current or a discharging current between the cap plate 31 and the vent plate 32.

The sub-plate 34 may face the vent plate 32 and may be electrically connected to the vent 321 and the middle plate 38 (e.g., during normal operation of the battery).

The middle plate 38 may be physically separated from the vent plate 32, and may be combined to or coupled with, e.g., indirectly coupled with, the vent plate 32 by interposing the insulator 33 therebetween.

In an implementation, the vent 321 may protrude through the insulator 33 and through-holes 330 and 381 of the middle plate 38 to be connected to the sub-plate 34.

Thus, the middle plate 38 may be electrically connected to the vent 321 and the vent plate 32 through the sub-plate 34.

The middle plate 38 may be connected, e.g., electrically, to the positive electrode lead tab 40 by welding, and the positive electrode lead tab 40 may penetrate through the positive electrode insulating plate 60 to be connected to the uncoated region 12b of the positive electrode 12 by welding.

As a result, current from the positive electrode lead tab 40 may sequentially pass through the middle plate 38, the sub-plate 34, the vent 321, the vent plate 32, and the PTC element 35, e.g., to be electrically connected to the cap plate 31.

The cap assembly 30 (configured as described above) may be inserted into the opening of the case 20 (with the gasket 50 interposed therebetween), and may then be fixed to or coupled with the case 20 at the opening of the case 20 by a crimping process, thereby forming the rechargeable battery 1.

For example, the case 20 may include a beading portion 21 that is depressed in a diametrical center direction of the case 20, and a clamping portion 22 that holds an external circumferential end of the cap assembly 30 with the gasket 50 therebetween.

Figure 3:
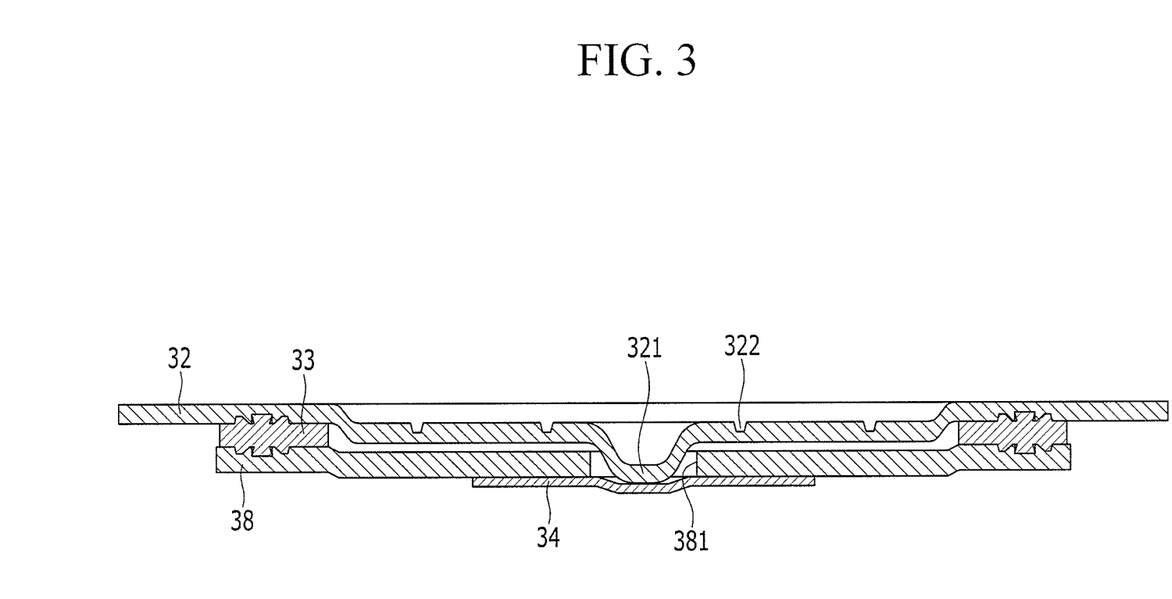
FIG. 3 illustrates a cross-sectional view of a current interrupting device of the cap assembly of FIG. 2.
Figure 4:
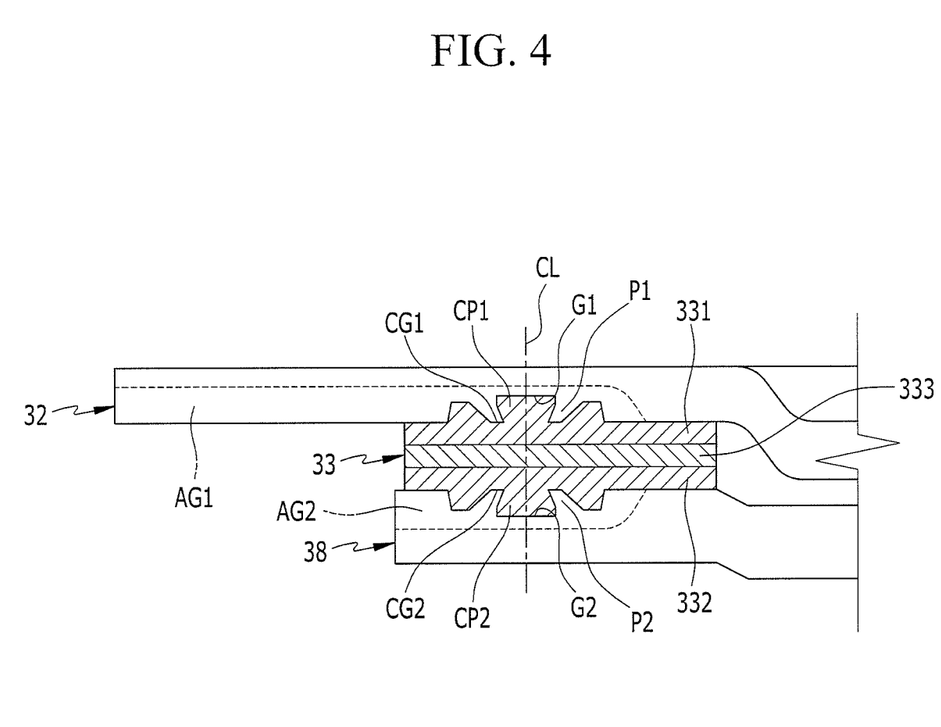
FIG. 4 illustrates a partial enlarged cross-sectional view of a connection structure in which a vent plate and a middle plate include an insulator therebetween.

FIG. 3 illustrates a cross-sectional view of a current interrupting device of FIG. 2, and FIG. 4 illustrates a partial enlarged cross-sectional view of a connection structure in which a vent plate and a middle plate include an insulator interposed therebetween.

Referring to FIGS. 3 and 4, the vent plate 32 and the middle plate 38 may each include protrusions and grooves that extend or are open in a direction toward the insulator 33. The protrusions and grooves of the vent plate 32 and the middle plate 38 may be combined to or coupled with corresponding or complementary grooves and corresponding or complementary protrusions in the insulator 33.

For example, the corresponding or complementary protrusions and grooves of the insulator 33 may be fusion-bonded to the protrusions and the grooves of the vent plate 32 and the middle plate 38. The fusion-bonding means a method for bonding materials together by heat and pressure. For example, when the heated insulator 33 is pressed into the vent plate 32 and the middle plate 38, the corresponding or complementary grooves and the corresponding or complementary protrusions may be formed in the insulator 33, and the insulator 33 may be fusion-bonded to the protrusions and the grooves of the vent plate 32 and the middle plate 38.

The vent plate 32 and the middle plate 38 may be fusion-bonded through the insulator 33, and thus a bent structure of the vent plate 32 may be removed or omitted.

Accordingly, an overall a height of the current interrupting device in the cap assembly 30 may be advantageously reduced.

In addition, the protrusions and the grooves of the vent plate 32 and the middle plate 38 may be fusion-bonded to the corresponding grooves and the corresponding protrusions of the insulator 33, and rotation of the vent plate 32 and the middle plate 38 with respect to each other may be suppressed or prevented, in addition to enhancing fastening strength therebetween.

For convenience, the first exemplary embodiment is described as including a first protrusion P1 and a first groove G1 in the vent plate 32 and a second protrusion P2 and a second groove G2 in the middle plate 38, such that the insulator 33 is fusion-bonded to both the vent plate 32 and the middle plate 38.

Although not illustrated, in an implementation, the first protrusion and the first groove may be provided only on the vent plate, or the second protrusion and the second groove may be provided only in the middle plate, such that the insulator may be fusion-bonded at one side while being flatly fusion-bonded at the other side.

In an implementation, the insulator 33 may include a first corresponding groove CG1 and a first corresponding protrusion CP1 at one side, such that they may be correspondingly fusion-bonded to the first protrusion P1 and the first groove G1. The insulator 33 may also include a second corresponding groove CG2 and a second corresponding protrusion CP2 at the other side, such that they may be correspondingly fusion-bonded to the second protrusion P2 and the second groove G2.

Although not illustrated, in an implementation, when provided with the first protrusion and the first groove only in the vent plate, the insulator may be correspondingly provided with the first corresponding groove and the first corresponding protrusion to be fusion-bonded, and when provided with the second protrusion and the second groove only in the vent plate, the insulator may be correspondingly provided with the second corresponding groove and the second corresponding protrusion to be fusion-bonded.

For example, the vent plate 32 may include the pair of first protrusions P1 and may be correspondingly provided with the first grooves G1 adjacent to or between the first protrusions P1.

The middle plate 38 may include the pair of second protrusions P2 and may be correspondingly provided with the second grooves G2 adjacent to or between the second protrusions P2.

Figure 5:
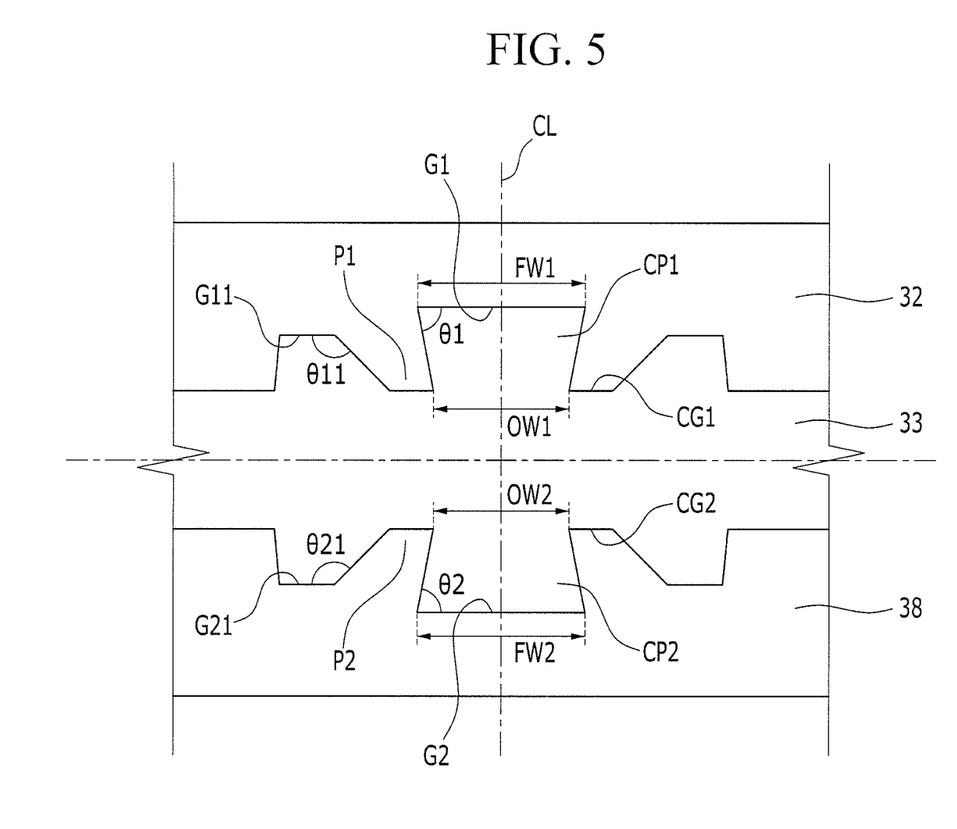
FIG. 5 illustrates an enlarged view of a portion combined with the insulator of FIG. 4.

FIG. 5 illustrates an enlarged view of a portion coupled with the insulator of FIG. 4.

Referring to FIGS. 4 and 5, in a diametrical direction of the cap assembly 30, a first angle θ1 between a bottom surface of the first groove G1 of the vent plate 32 and one side surface of the first protrusion P1 of the vent plate 32 connected or adjacent thereto may be acute.

In an implementation, a second angle θ2 between a bottom surface of the second groove G2 of the middle plate 38 and one side surface of the second protrusion P2 of the middle plate 38 connected or adjacent thereto may be acute.

The first and second angles θ1 and θ2 may be equal to or different from each other.

For example, a first groove bottom width FW1 (set by the bottom surface of the first groove G1 in the vent plate 31) may be greater than a first groove opening width OW1 (set between end portions of the first protrusions P1 that are connected to the bottom surface to face each other).

In an implementation, a second groove bottom width FW2 (set by the bottom surface of the second groove G2 in the middle plate 38) may be greater than a second groove opening width OW2 (set between end portions of the second protrusions P2 that are connected to the bottom surface to face each other).

The insulator may include a pair of the first corresponding grooves CG1 correspondingly or complementarily combined to or coupled with the first protrusion P1 of the vent plate 32, and may include the first corresponding protrusion CP1 correspondingly or complementarily fusion-bonded between the pair of the first corresponding grooves CG1 to the first groove G1 that has the first groove bottom width FW1 and the first groove opening width OW1.

Thus, the insulator 33 and the vent plate 32 may mutually have high fastening strength therebetween in a vertical direction of FIG. 5, and may be prevented from rotating with respect to each other.

In an implementation, the insulator 33 may include a pair of the second corresponding grooves CG2 correspondingly or complementarily combined to or coupled with the second protrusion P2 of the middle plate 38, and may include the second corresponding protrusion CP2 correspondingly or complementarily fusion-bonded between the pair of the second corresponding grooves CG2 to the second groove G2 that has the second groove bottom width FW2 and the second groove opening width OW2.

Thus, the insulator 33 and the middle plate 38 may mutually have high fastening strength therebetween in the vertical direction of FIG. 5, and may be prevented from rotating with respect to each other.

The pair of the first protrusions P1 in the vent plate 32 may be symmetrical to each other based on a center line CL of the first groove G1 of the vent plate 32.

The pair of the first protrusions P1 in the middle plate 38 may be symmetrically formed based on a center line CL of the second groove G2 of the middle plate 38.

The first angle θ1 of the first protrusion P1 of the vent plate 32 may be acute, and an eleventh angle θ11 between the other side surface of the first protrusion P1 and a bottom surface of an eleventh groove G11 (e.g., a groove or grooves at a side or sides of the first groove G1) may be obtuse.

The second angle θ2 of the second protrusion P2 of the middle plate 38 may be acute, and a twenty-first angle θ21 formed between the other side surface of the first protrusion P2 and a bottom surface of a twenty-first groove G21 (e.g., a groove or grooves at a side or sides of the second groove G2) may be obtuse.

The eleventh and twenty-first angles θ11 and θ21 may be equal to or different from each other.

The insulator 33 may first be fusion-bonded to be combined to the vent plate 32 with respect to the first and eleventh grooves G1 and G11 and the first and eleventh angles θ1 and θ11 of the first protrusion P1, and may secondly be fusion-bonded to be combined to the middle plate 38 with respect to the second and twenty-first grooves G1 and G11 and the second and twenty-first angles θ2 and θ21 of the second protrusion P2.

The eleventh angle θ11 may increase a fusion-bonded area between the insulator 33 and the vent plate 32 and may help enhance the fastening strength therebetween. The twenty-first angle θ21 may increase a fusion-bonded area between the insulator 33 and the middle plate 33 and may help enhance the fastening strength therebetween.

Although not illustrated, in an implementation, the insulator may be firstly or secondly fusion-bonded to be combined at one side while being flatly fusion-bonded at the other side.

Figure 6:
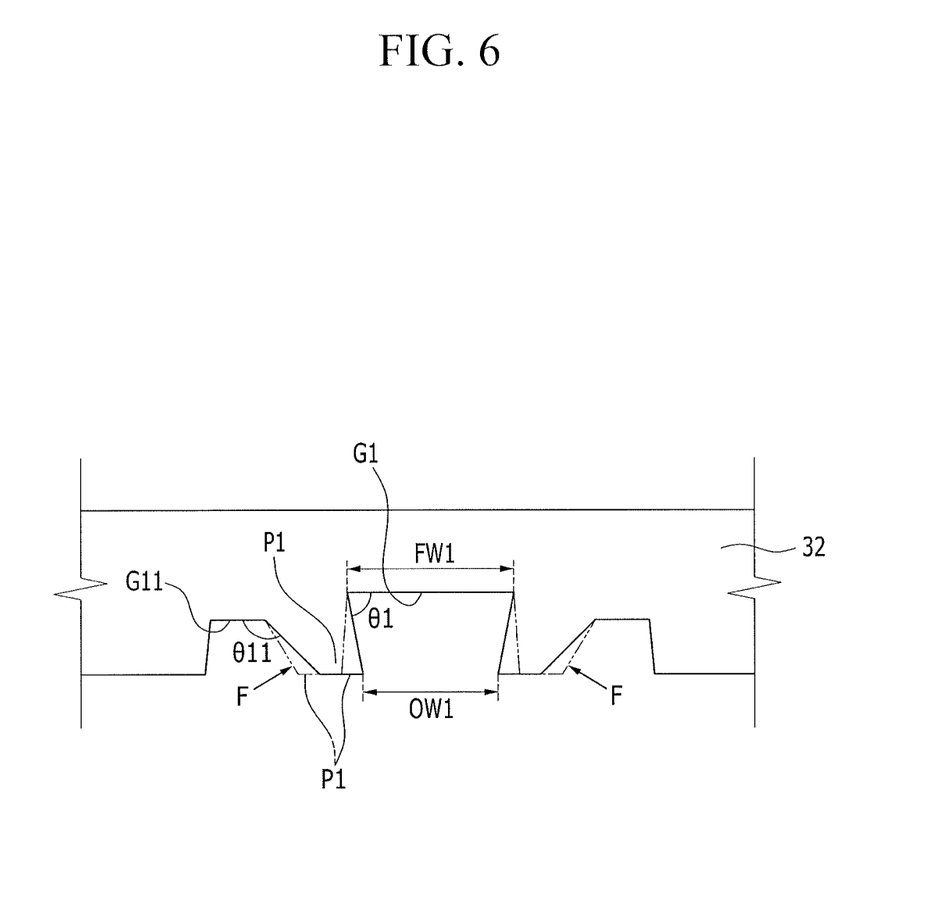
FIG. 6 illustrates an enlarged view of a portion of the vent plate of FIG. 5 combined with the insulator before and after it is deformed.

FIG. 6 illustrates an enlarged view of a portion of the vent plate of FIG. 5 to be coupled with the insulator before and after it is deformed.

The same forming method is used to form the first protrusion P1 and the first and eleventh grooves G1 and G11 in the vent plat 32 and the second protrusion P2 and the second and twenty-first grooves G2 and G21 in the middle plate 38.

Thus, for convenience, a forming method of the first protrusion P1 and the first and eleventh grooves G1 and G11 in the vent plate 32 will now be described with reference to FIG. 6.

For example, in a first processing step, the first protrusion P1 of the vent plate 32 may be produced, as shown with an imaginary or dashed line in FIG. 6.

In a second processing step, an impact or force F may be delivered to the first protrusion P1 in an arrow direction to deform the first protrusion P1 and the first and eleventh angles θ1 and θ11, as shown with a solid line in FIG. 6.

For example, in the vent plate 32, the first groove G1 may be set by the first groove bottom width FW1 and the first groove opening width OW1.

Figure 7:
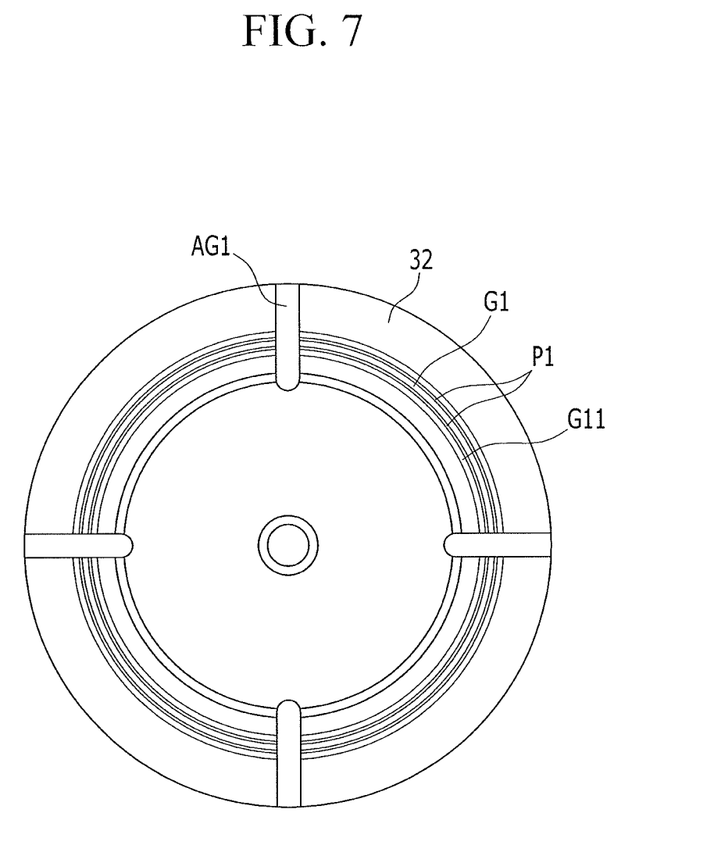
FIG. 7 illustrates a bottom surface view of the vent plate of FIG. 3.

FIG. 7 illustrates a bottom surface view of the vent plate of FIG. 3.

Referring to FIGS. 4 and 7, the vent plate 32 and the middle plate 38 may include air discharging grooves AG1 and AG2 at surfaces thereof that face the insulator 33.

The air discharging grooves AG1 and AG2 may be formed in the vent plate 32 and in the middle plate 38 in the same structure, e.g., may take the same form in the vent plate 32 and the middle plate 38.

Thus, for convenience, FIG. 7 exemplarily illustrates the air discharging grooves AG1 of the vent plate 32.

When the vent plate 32 and the insulator 33 are fusion-bonded, remaining air at the first and the eleventh grooves G1 and G11 between the first protrusions P1 of the vent plate 32 may be discharged through the air discharging grooves AG1.

Thus, the vent plate 32 and the insulator 33 may be strongly fusion-bonded.

Referring to FIG. 7, the air discharging grooves AG1 in the vent plate 32 may extend in a diametrical or radial direction of the insulator 33, and may be spaced apart from each other in a circumferential direction.

Although not illustrated, in an implementation, the air discharging grooves AG2 in the middle plate 38 may correspond to, overlie, or be aligned with the air discharging grooves AG1 in the vent plate 32.

Referring back to FIG. 4, in an implementation, the insulator 33 may include, e.g., a first polyethylene layer 331 on the vent plate 32, a second polyethylene layer 332 on the middle plate 38, and a poly(butylene terephthalate) fiber layer 333 that is integrally formed between the first polyethylene layer 331 and the second polyethylene layer 332.

The first polyethylene layer 331 may help secure a fusion-bonding strength with the vent plate 32, the second polyethylene layer 332 may help secure fusion-bonding strength with the middle plate 38, and the poly(butylene terephthalate) fiber layer 333 may help provide durability of the insulator 33 between the first and second polyethylene layers 331 and 332.

Hereinafter, a second exemplary embodiment will be described. Compared with the configurations of the first exemplary embodiment, a repeated description of the same configurations may be omitted while different configurations will be described.

Figure 8:
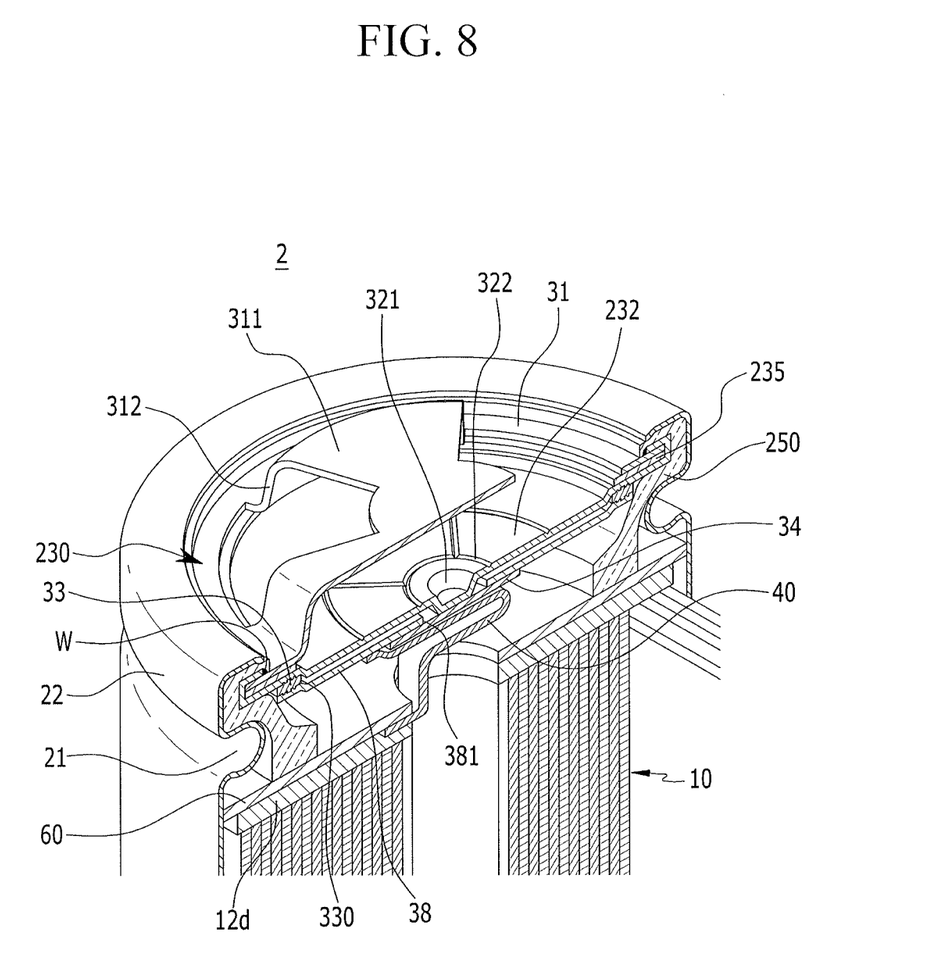
FIG. 8 illustrates a partial cross-sectional perspective view of a rechargeable battery according to a second exemplary embodiment.

FIG. 8 illustrates a partial cross-sectional perspective view of a rechargeable battery according to a second exemplary embodiment.

Referring to FIG. 8, in a rechargeable battery 2 of the second exemplary embodiment, an insulating member 235 may be interposed between the cap plate 31 and a vent plate 232, e.g., at outer ends of the cap plate 31 and the vent plate 232, such that an end portion of the vent plate 232 is bent in a side opposite to the insulator 33 to be welded and electrically connected to a top surface of the cap plate 31.

A gasket 250 may continuously enclose the vent plate 232 at an outer side of the insulator 33 from below, above, and a lateral side.

For example, a welding portion W of the vent plate 232 and the cap plate 31 may be coated with the gasket 250 such that it is effectively prevented from being corroded.

The vent plate 232 may enclose an outer side of the electrode assembly 230 and may be welded to the top surface of the cap plate 31, and the rechargeable battery of the second exemplary embodiment may be effectively used in an environment that is vulnerable to vibrations.

By way of summation and review, the vent plate and the middle plate may include insulator(s) therebetween, and may be combined or coupled to each other, thereby implementing an electrically insulating structure.

The insulator may be interposed between an inner side surface of the middle plate (bent once), and a surface of the vent plate (bent twice).

A structure in which the vent plate and the middle plate are bent and the insulator is inserted therebetween may increase a height of the current interrupting device (that includes the vent plate, the insulator, the middle plate, and the sub-plate), thereby decreasing capacity of the electrode assembly inside the case.

In addition, a fastening force may not be sufficient due to simple insertion of the insulator, and the vent plate and the middle plate may rotate with respect to each other in the cap assembly.

The embodiments may provide a rechargeable battery having a current blocking unit.

The embodiments may provide a rechargeable battery that includes a current interrupting device in a cap assembly that has a reduced height.

The embodiments may provide a rechargeable battery that may help prevent a vent plate and a middle plate from rotating with respect to each other in a cap assembly.

As described above, according to the exemplary embodiment, the vent and middle plates of the cap assembly may be fusion-bonded by the insulator interposed therebetween, such that a height increase due to the bent vent plate may be prevented, and a height of the current interrupting device may be decreased in the cap assembly.

In addition, the protrusions and the grooves facing the insulator may be formed in at least one of the vent plate and the middle plate such that they may be correspondingly combined to corresponding grooves and corresponding protrusions of the insulator, thereby helping to prevent rotation of the vent plate and the middle plate with respect to each other.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

<Description of Symbols>

| | |
|---|---|
| 1, 2: rechargeable battery | 10: electrode assembly |
| 11: first electrode (negative electrode) | 11a, 12a: coated region |
| 11b, 12b: uncoated region | |
| 11d, 12d: negative, positive current collecting plate | |
| 12: second electrode (positive) | 13: separator |
| 14: center pin | 20: case |
| 21: beading portion | 22: clamping portion |
| 30: cap assembly | 31: cap plate |
| 32, 232: vent plate | 33: insulator |
| 34: sub-plate | |
| 35: positive temperature coefficient element (PTC) | |
| 38: middle plate | 40: positive electrode lead tab |
| 50, 250: gasket | 60: positive electrode insulating plate |
| 321: vent | 322: notch |
| 235: insulating member | 311: protruding portion |
| 312: exhaust hole | 330, 381: through-hole |
| 331, 332: first, second polyethylene layer | |
| 333: polybutylene terephthalate fiber layer | |
| AG1, AG2: air discharging groove | CG1: first corresponding groove |
| CG2: second corresponding groove | CL: center line |
| CP1, CP2: first, second corresponding protrusion | |
| FW1, FW2: first, second groove bottom width | |
| G1, G11: first, eleventh groove | |
| G2, G21: second, twenty-second groove | |
| OW1, OW2: first, second groove opining width | |
| P1, P2: first, second protrusion | |
| θ1, θ11: first, eleventh angle | θ2, θ21: second, twenty-first angle |

What is claimed is:

1. A rechargeable battery, comprising:
an electrode assembly for performing charging and discharging operations;
a case accommodating the electrode assembly, the case being electrically connected to a first electrode of the electrode assembly; and
a cap assembly coupled with an opening of the case with a gasket between the cap assembly and the case, the cap assembly being electrically connected to a second electrode of the electrode assembly,
wherein the cap assembly includes:
a vent plate that is electrically connected to a cap plate;
a middle plate that is separated from the vent plate, that includes a through hole that is penetrated by a vent protruding from the vent plate, and that is electrically connected to the second electrode;
an insulator interposed between the vent plate and the middle plate; and
a sub-plate electrically connecting the vent with the middle plate,
wherein at least one of the vent plate or the middle plate includes a protrusion and a groove facing the insulator, the protrusion being coupled with a complementary groove in the insulator and the groove being coupled with a complementary protrusion in the insulator.

2. The rechargeable battery as claimed in claim 1, wherein the protrusion and the groove of the insulator are fusion-bonded to the groove and the protrusion of the at least one of the vent plate or the middle plate.

3. The rechargeable battery as claimed in claim 1, wherein the protrusion and groove facing the insulator includes a pair of protrusions in the vent plate and includes grooves in the vent plate adjacent to the protrusions.

4. The rechargeable battery as claimed in claim 1, wherein the protrusion and groove facing the insulator includes a pair of protrusions in the middle plate and includes grooves in the middle plate adjacent to the protrusions.

5. The rechargeable battery as claimed in claim 1, wherein the protrusion and the groove facing the insulator include:
a first protrusion and a first groove on the vent plate, and
a second protrusion and a second groove on the middle plate, wherein the first protrusion and the first groove are symmetrical to the second protrusion and the second groove in a stacking direction with the insulator therebetween.

6. The rechargeable battery as claimed in claim 5, wherein the vent plate and the middle plate each include air discharging grooves on surface thereof that face the insulator.

7. The rechargeable battery as claimed in claim 6, wherein the air discharging grooves extend lengthwise in a radial direction of the insulator and are separated from each other in a circumferential direction.

8. The rechargeable battery as claimed in claim 5, wherein:
an angle between a bottom surface of the first groove of the vent plate and an adjacent side surface of the first protrusion of the vent plate is acute, and
an angle between a bottom surface of the second groove of the middle plate and an adjacent side surface of the second protrusion of the middle plate is acute.

9. The rechargeable battery as claimed in claim 5, wherein:
the vent plate includes a pair of facing first protrusions,
a width of a bottom surface of the first groove of the vent plate is greater than a groove opening width between end portions of the pair of facing first protrusions that extend from the bottom surface of the first groove,
the middle plate includes a pair of facing second protrusions, and
a width of a bottom surface of the second groove of the middle plate is greater than a groove opening width between end portions of the pair of facing second protrusions that extend from the bottom surface of the second groove.

10. The rechargeable battery as claimed in claim 9, wherein the insulator includes:
a pair of first corresponding grooves, the pair of first corresponding grooves having a shape complementary to and being coupled with the pair of first protrusions of the vent plate,
a pair of second corresponding grooves, the pair of second corresponding grooves having a shape complementary to and being coupled with the pair of second protrusions of the middle plate,
a first corresponding protrusion, the first corresponding protrusion having a shape complementary to and being coupled with the first groove of the vent plate, and
a second corresponding protrusion, the second corresponding protrusion having a shape complementary to and being coupled with the second groove of the middle plate.

11. The rechargeable battery as claimed in claim 9, wherein:

the pair of first protrusions of the vent plate are symmetrically disposed about a center line passing through the first groove in a circumferential direction of the cap assembly, the pair of second protrusions of the middle plate are symmetrically disposed about a center line passing through the second groove in a circumferential direction of the cap assembly, an angle between the bottom surface of the first groove of the vent plate and an adjacent side surface of each first protrusion of the vent plate is acute, an angle between the bottom surface of the second groove of the middle plate and an adjacent side surface of each second protrusion of the middle plate is acute, the vent plate includes an eleventh groove at outer sides of the first groove, the middle plate includes a twenty-first groove at outer sides of the second groove, an angle between a bottom surface of the eleventh groove of the vent plate and another side surface of each first protrusion of the vent plate is obtuse, and an angle between a bottom surface of the twenty-first groove of the middle plate and another side surface of each second protrusion of the middle plate is obtuse.

12. The rechargeable battery as claimed in claim 11, wherein the insulator is coupled with the vent plate or the middle plate by at least one of:

a first fusion-bonding to the first groove and the first protrusions of the vent plate at one side thereof, or a second fusion-bonding to the second groove and the second protrusions of the middle plate at another side thereof.

13. The rechargeable battery as claimed in claim 12, wherein the cap assembly further includes a positive temperature coefficient element between the cap plate and the vent plate.

14. The rechargeable battery as claimed in claim 12, wherein the insulator includes:

a first polyethylene layer adjacent to the vent plate, a second polyethylene layer adjacent to the middle plate, and a poly(butylene terephthalate) fiber layer integrally formed between the first and second polyethylene layers.

15. The rechargeable battery as claimed in claim 1, wherein the middle plate is connected to the second electrode through a lead tab.

16. The rechargeable battery as claimed in claim 1, further comprising an insulating member between a portion of the vent plate and a portion of the cap plate, wherein an end region of the vent plate is bent around the insulator to be electrically connected to a top surface of the cap plate.

17. The rechargeable battery as claimed in claim 16, wherein the gasket continuously encloses the vent plate from below, above, and a lateral side thereof at an outer side of the insulator.

* * * * *